(12) United States Patent
Kojima

(10) Patent No.: US 7,333,696 B2
(45) Date of Patent: Feb. 19, 2008

(54) TAPE-SHAPED OPTICAL FIBER CABLE

(75) Inventor: Seiji Kojima, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/699,036

(22) Filed: Jan. 29, 2007

(65) Prior Publication Data

US 2007/0196059 A1    Aug. 23, 2007

(30) Foreign Application Priority Data

Feb. 22, 2006    (JP) .............................. 2006-045407

(51) Int. Cl.
*G02B 6/00* (2006.01)
*G02B 6/44* (2006.01)

(52) U.S. Cl. .................. 385/100; 385/31; 385/37; 385/102; 385/114; 385/123; 385/141

(58) Field of Classification Search ............... 385/100, 385/123, 12, 114, 37, 31, 141
See application file for complete search history.

(56) References Cited

U.S. PATENT DOCUMENTS 5,253,318 A * 10/1993 Sayegh et al. .............. 385/114
5,878,179 A * 3/1999 Schricker ................... 385/100

FOREIGN PATENT DOCUMENTS

JP    2002-70015    3/2002

OTHER PUBLICATIONS

B. Glisic, D. Inaudi, "Sensing tape for easy integration of optical fiber sensors in composite structures" SPIE, International Symposium on Smart Structures and Materials, Mar. 2-6, 2003.
B. Glisic, D. Inaudi, "Integration of long-gage fiber-optic sensor into a fiber-reinforced composite sensing tape" 16th International Conference on Optical Fiber Sensors, Nara, Japan, Oct. 13-17, 2003.

* cited by examiner

*Primary Examiner*—Frank G. Font
*Assistant Examiner*—Michael P. Mooney
(74) *Attorney, Agent, or Firm*—McGinn IP Law Group, PLLC

(57) ABSTRACT

A tape-shaped optical fiber cable has: a tape member formed of a fiber material and a cured resin formed around the fiber material; and an optical fiber embedded in the tape member. The optical fiber is covered by a covering material, the fiber material comprises a bidirectional fiber material. The optical fiber is embedded in the tape member such that one fiber array direction of the bidirectional fiber material is parallel to a longitudinal direction of the optical fiber and the other fiber array direction of the bidirectional fiber material is perpendicular to the longitudinal direction of the optical fiber.

10 Claims, 5 Drawing Sheets

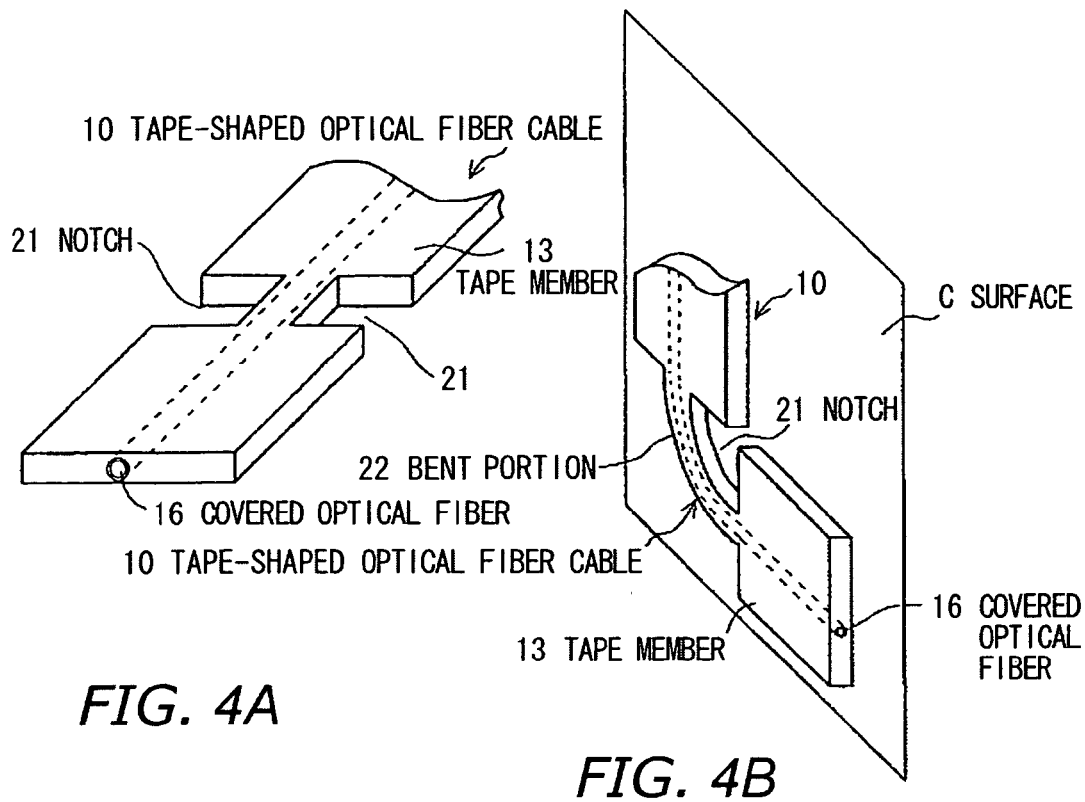
FIG. 4A
FIG. 4B
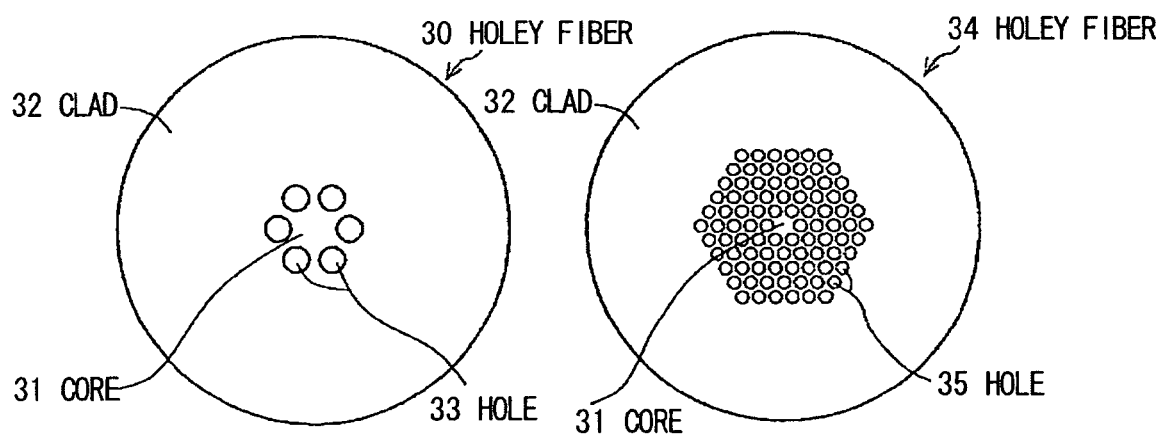
FIG. 5A
FIG. 5B

TAPE-SHAPED OPTICAL FIBER CABLE

The present application is based on Japanese patent application No. 2006-045407, the entire contents of which are incorporated herein by reference.

BACKGROUND OF THE INVENTION

1. Field of the Invention

This invention relates to a tape-shaped optical fiber cable and, in particular, to a tape-shaped optical fiber cable that is used as a fiber sensor etc. to be installed in a structure so as to measure its temperature, strain etc.

2. Description of the Related Art

A tape-shaped optical fiber cable is known which is installed in a structure as a fiber sensor in order to measure its temperature and strain (e.g., See nonpatent literatures 1 and 2 as mentioned later).

As shown in FIG. 10, the tape-shaped optical fiber cable 70 has a tape member 73 formed by embedding unidirectional-arrayed glass fibers 71 in a thermoplastic resin 72, and a covered optical fiber 76 embedded in the tape member 73. The covered optical fiber 76 has an optical fiber 74 and a covering material 75 of polyimide etc. covering the optical fiber 74. For example, the tape-shaped optical fiber cable 70 is 13 mm in width and 0.2 mm in thickness, the optical fiber 74 is 125 μm in diameter, and the covered optical fiber 76 is 145 μm in diameter.

The tape-shaped optical fiber cable 70 is installed in a structure by being fixed to a surface thereof or by being embedded in an inside thereof in order to measure a strain applied to the structure itself. Therefore, the tape member 73 uses the thermoplastic resin 72 and the glass fiber 71 with an excellent heat resistance so as to measure the strain even in a high-temperature environment such as a plant. The tape member 73 is formed by heating the thermoplastic resin to a predetermined temperature to soften the resin, and then molding it at a low temperature. An optical fiber generally used for communications has a low heat resistance, i.e., its heat resistance temperature is not more than 100° C., since it is covered by a covering material of ultraviolet curable acrylic resin. Therefore, in the tape-shaped optical fiber cable 70, a polyimide covering material with a heat resistance temperature of about 300° C. is adopted as the heat-resistant covering material for the fiber sensor.

The tape-shaped optical fiber cable 70 is used as a sensing part of the fiber sensor such that it can measure a change in a measured object by detecting a reflected light (a backscattered light) propagating through the optical fiber.

FIG. 11 is a graph showing a backscattered light spectrum. As shown in FIG. 11, for example, when a Rayleigh scattering light RL with a central wavelength $\lambda_0$ is generated, Brillouin scattering lights Bs, Ba are respectively generated at the long-wavelength side and the short-wavelength side of the $\lambda_0$. Further, Raman scattering lights RMa, RMs are respectively generated at the shorter-wavelength side of the short-wavelength Brillouin scattering light Ba, and at the longer-wavelength side of the long-wavelength Brillouin scattering light Bs. The Raman scattering light RMs is also called a Stokes light and the Raman scattering lights RMa is also called an anti-Stokes light.

In case of using the optical fiber as a strain measuring sensor, amount of a wavelength shift in the Brillouin scattering light Bs is measured to determine the strain based on the measured value. On the other hand, in case of using the optical fiber as a temperature measuring sensor, temperature is determined based on the intensity ratio of the Stokes light RMs and the anti-Stokes light RMa in the Raman scattering light.

The following patent literature and nonpatent literatures are assumed relevant to the tape-shaped optical fiber cable of the invention.

Patent literature 1: JP-A-2002-70015

Nonpatent literature 1: B. Glisic, D. Inaudi, "Sensing tape for easy integration of optical fiber sensors in composite structures" SPIE, International Symposium on Smart Structures and Materials, 2-6, Mar. 2003.

Nonpatent literature 2: B. Glisic, D. Inaudi, "Integration of long-gage fiber-optic sensor into a fiber-reinforced composite sensing tape" 16th International Conference on Optical Fiber Sensors, Nara, Japan, 13-17, Oct. 2003.

However, the following problems are found in the conventional tape-shaped optical fiber cable.

(1) The rigidity (tape rigidity) required for the tape-shaped optical fiber cable is different depending on the structure where the cable is installed. For example, the required rigidity is determined depending on environment where the cable is installed, e.g., a situation where it is installed in bent state and a situation where it is embedded in the structure.

The tape rigidity is determined by a thickness of the tape member 73. Further, the thickness of the tape member 73 can be determined depending on an outer diameter of the covered optical fiber 76, a thickness of the glass fiber 71, and a thickness of the thermoplastic resin 72.

The conventional tape-shaped optical fiber cable 70 is about 0.2 mm in tape thickness, and the covered optical fiber 76 is 145 μm in outer diameter. Thus, since the outer diameter of the covered optical fiber 76 is large relative to the tape thickness, it is difficult to reduce the tape thickness of the tape-shaped optical fiber cable to less than 0.2 mm. Therefore, the conventional tape-shaped optical fiber cable 70 may not be installed due to the installation environment such as a situation where the thickness of the cable 70 is limited by the shape of the structure to install the cable 70.

For example, when the tape-shaped optical fiber cable is embedded in a fuel tank or an aircraft formed of a carbon fiber reinforced plastic multilayer board (with a single-layer thickness of about 0.13 mm), it needs to have a tape thickness less than 0.13 mm, i.e., the single-layer thickness of the carbon fiber reinforced plastic multilayer board since it may cause a deterioration in strength by being embedded therein.

(2) Generally, a glass fiber is strong to tensile strength but is weak to shear strength. Since the conventional tape-shaped optical fiber cable 70 uses the unidirectional-arrayed glass fiber 71, the cable 70 is strong in the longitudinal direction of the fiber but is weak in a direction perpendicular to the longitudinal direction of the fiber. Thus, the cable 70 is suited to be installed in one direction (linearly) based on the tape rigidity, but it is not suited to be installed in bent state since the cable 70 may be broken due to a force applied from the side directions of the cable 70.

(3) The conventional tape-shaped optical fiber cable 70 uses a general optical fiber for communications. The optical fiber for communications is suitable for a long-distance transmission since it has a low light transmission loss in a situation where a macro-bending or a micro-bending is not caused.

However, since the optical fiber 74 is embedded in the tape member 73 and disposed between the glass fibers, the cable 70 may be subjected to a micro-bending generated due to a minute bending distributed in the longitudinal direction of the fiber or a compression strain applied to the cable 70 when the thermoplastic resin 72 is shrunk at a low temperature. Thus, the conventional tape-shaped optical fiber cable 70 will be subjected to a large light transmission loss caused by the macro-bending or the micro-bending. As a result, it becomes difficult to use the cable 70 to measure the strain over long distances.

(4) The conventional tape-shaped optical fiber cable 70 is used to measure the strain of a measured object where the cable 70 is installed by using the Brillouin scattering light whose amount of wavelength shift changes according to the stain applied to the optical fiber 74, and to measure the temperature of the measured object by using the Raman scattering light whose intensity ratio changes according to its temperature.

However, since the optical fiber 74 is subjected to a distributed bending loss caused by that the optical fiber cable is tape-shaped, it is difficult to distinguish a change in light intensity caused by the temperature from a change in light intensity caused by on the bending loss. As a result, it is difficult to accurately measure the temperature.

SUMMARY OF THE INVENTION

It is an object of the invention to provide a tape-shaped optical fiber cable that can be installed or embedded in various structures while having a high mechanical strength in multiple directions.

It is a further object of the invention to provide a tape-shaped optical fiber cable that can reduce a loss caused by a bending or a micro-bending to accurately measure a temperature, a strain etc. of a measured object.

(1) According to one aspect of the invention, a tape-shaped optical fiber cable comprises:

a tape member comprising a fiber material and a cured resin formed around the fiber material; and an optical fiber embedded in the tape member, wherein the optical fiber is covered by a covering material, the fiber material comprises a bidirectional fiber material, and the optical fiber is embedded in the tape member such that one fiber array direction of the bidirectional fiber material is parallel to a longitudinal direction of the optical fiber and an other fiber array direction of the bidirectional fiber material is perpendicular to the longitudinal direction of the optical fiber.

In the above invention, the following modifications and changes can be made.

(i) The cable comprises a thickness of 46 to 225 µm.

(ii) The optical fiber comprises a holey fiber or a photonic crystal fiber, each of which comprising a plurality of holes formed in a clad thereof.

(iii) The optical fiber comprises a relative refractive index difference of 0.6 to 3.0%.

(iv) The covering material comprises a polyimide resin.

(v) The fiber material comprises at least one of a glass fiber, an aramid fiber, a carbon fiber, and a poly-p-phenylene benzo bisoxazole (PBO) fiber.

(vi) The cured resin comprises at least one of an unsaturated polyethylene resin, a vinyl ester resin, an epoxy resin, a polyimide resin, a polyphenylene sulfide resin, a polyether ether ketone resin, and a polybutene resin.

(vii) The tape member comprises a notch formed at a side thereof.

(viii) The optical fiber comprises a fiber Bragg grating formed therein.

(ix) A tip portion of the optical fiber protrudes from the tape member, and a protective material to protect the optical fiber is formed on the tip portion.

ADVANTAGES OF THE INVENTION

The present invention can provide a tape-shaped optical fiber cable that can achieve the following advantages.

(a) It can be installed or embedded in various structures.

(b) It can have a high mechanical strength in multiple directions.

(c) It can reduce a loss caused by a bending or a micro-bending to accurately measure a temperature, a strain etc. of a measured object.

BRIEF DESCRIPTION OF THE DRAWINGS

The preferred embodiments according to the invention will be explained below referring to the drawings, wherein:

FIG. 4A is a perspective view showing a method of installing the tape-shaped optical fiber cable shown in FIG. 1;

FIG. 4B is a perspective view showing a method of installing the tape-shaped optical fiber cable shown in FIG. 1;

FIG. 5A is a cross sectional view showing an example of a holey optical fiber cable;

FIG. 5B is a cross sectional view showing an another example of a holey optical fiber cable;

DETAILED DESCRIPTION OF THE PREFERRED EMBODIMENTS

Figure 1:
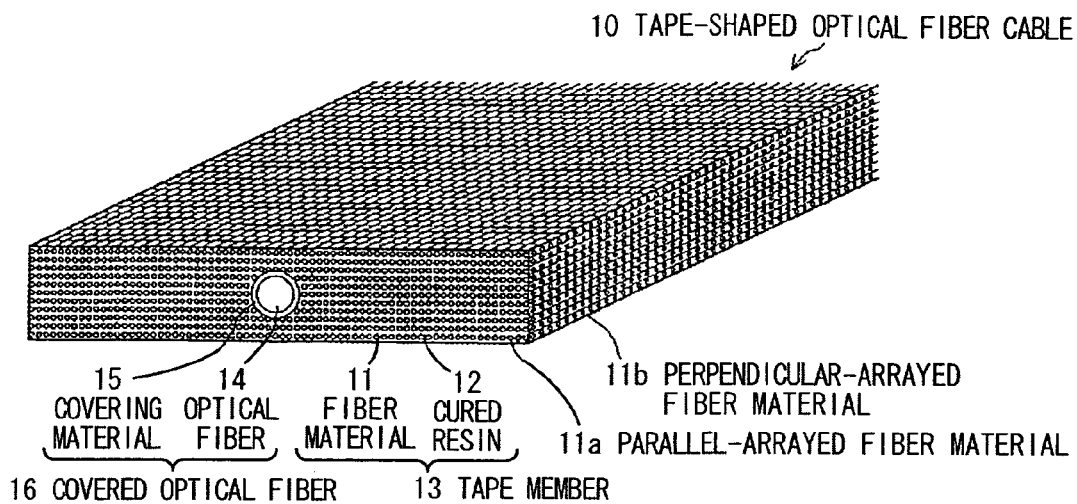
FIG. 1 is a perspective view showing a tape-shaped optical fiber cable in a preferred embodiment according to the invention.

FIG. 1 is a perspective view showing a tape-shaped optical fiber cable in the preferred embodiment according to the invention.

As shown in FIG. 1, a tape-shaped optical fiber cable 10 comprises an elongate tape member 13 having plural fiber materials 11 and a cured resin 12 formed around the fiber materials 11, and an optical fiber 14 embedded in the tape member 13.

In the tape-shaped optical fiber cable 10 of the preferred embodiment, the optical fiber 14 is covered with a covering material 15, the fiber material 11 comprises a bidirectional fiber material, and the optical fiber 14 is embedded such that one materials 11a of the bidirectional fiber material 11 are arrayed parallel to the longitudinal direction of the fiber 14 and the other materials 11b of the bidirectional fiber material 11 are arrayed perpendicular to the longitudinal direction of the fiber 14. The cable 10 is 46 to 225 μm in thickness. The optical fiber 14 is covered by the covering material 15 to form a covered optical fiber 16.

In the preferred embodiment, a holey fiber is used as the optical fiber 14, and polyimide resin is used as the covering material 15. The bidirectional fiber material 11 as a bidirectional crossing material is formed of a glass fiber, and the cured resin 12 is formed of a heat-curable resin, in particular vinyl ester resin.

A method of making the tape-shaped optical fiber cable 10 of the preferred embodiment will be explained below.

Figure 2:
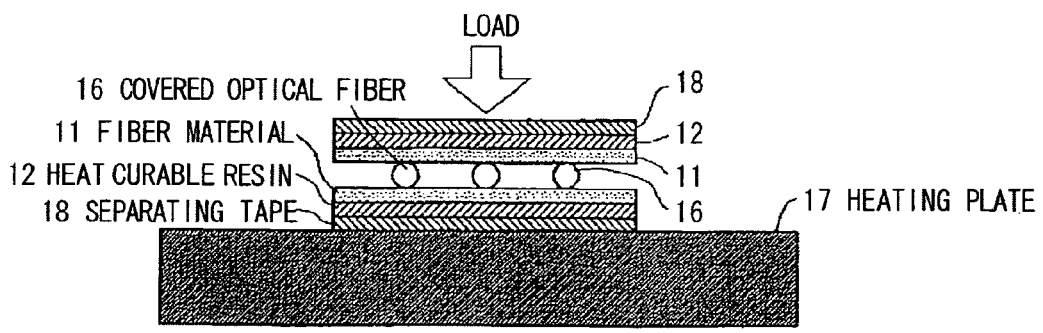
FIG. 2 is a cross sectional view showing a making method of the tape-shaped optical fiber cable shown in FIG. 1.

As shown in FIG. 2, a heating plate 17 is used to harden the heat-curable resin 12 such as vinyl ester. A separating tape 18 is disposed on the heating plate 17 heated to about 45° C. to prevent the heat-curable resin 12 from sticking to the plate 17. Then, the heat-curable resin 12, the fiber material 11, the covered optical fiber 16, the fiber material 11, the heat-curable resin 12 and the separating tape 18 are stacked thereon in this order. Then, a load is applied, from the top surface side of the separating tape 18 as a top layer, onto each of the stacked cable components (i.e., the covered optical fiber 16, the fiber material 11 and the heat-curable resin 12) by using a roller etc. (not shown). By applying the load, the cable components are pressure-bonded to each other such that the covered optical fiber 16 is embedded in the fiber material 11 and the heat-curable resin 12, and the heat-curable resin 12 is hardened to produce the tape-shaped optical fiber cable 10. The load is applied to each of the cable components by being controlled in magnitude to adjust the thickness of the tape-shaped optical fiber cable 10.

Although only its cross section cut along one direction is shown in FIG. 2, the cable components are each sent out by a roller etc. to produce the elongate tape-shaped optical fiber cable 10. In forming the tape-shaped optical fiber cable 10 with a thickness of 46 to 225 μm, the thin optical fiber 14 with an outer diameter of 40 to 125 μm is used for the covered optical fiber 16, and the tape member 13 is formed 3 to 50 μm in thickness from the top end and bottom end, respectively, of the covered optical fiber 16.

The tape thickness (or the tape rigidity) of the tape-shaped optical fiber cable 10 is adjusted according to the shape of the structure in which the cable 10 is installed or embedded. The tape-shaped optical fiber cable 10 of the embodiment is formed with a thickness of 0.225 mm or less so that it can be installed or embedded in a structure that requires a low-profile tape-shaped optical fiber cable. For example, the tape-shaped optical fiber cable 10 of the embodiment has a reduced tape rigidity and is formed with a thickness of not more than a single-layer thickness (about 0.13 mm) of a carbon fiber reinforced plastic multilayer board as a measured object structure. Thus, the cable 10 can be embedded in the structure without causing deterioration in strength of the structure. Further, since the tape-shaped optical fiber cable 10 is reduced in thickness, it can be installed in the structure in bent state.

In the embodiment, since the bidirectional crossing fiber material is used as the fiber material 11, its shear strength in directions parallel to and perpendicular to the longitudinal direction of the optical fiber can be increased. Further, the covered optical fiber 16 is embedded in the bidirectional crossing fiber material such that one fiber direction of the bidirectional crossing fiber material is arrayed parallel to the longitudinal direction of the fiber 16 and the other fiber direction thereof is arrayed perpendicular to the longitudinal direction of the fiber 16. Thus, the tape-shaped optical fiber cable 10 can be easy split along the longitudinal direction of the optical fiber and can be easy cut perpendicular to the longitudinal direction of the optical fiber.

Figure 3:
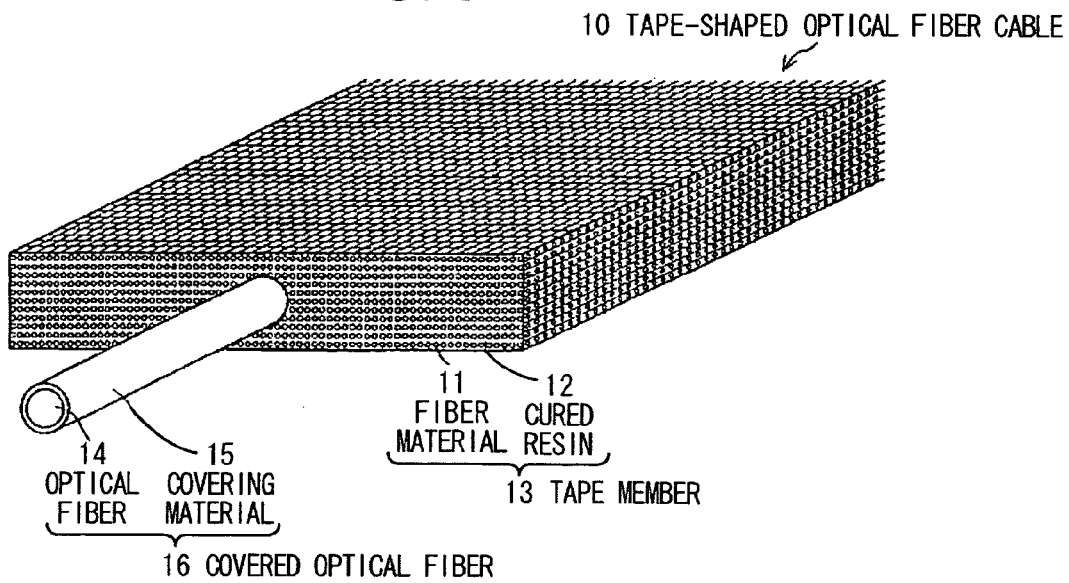
FIG. 3 is a perspective view showing an example of a partially removed tape material of the tape-shaped optical fiber cable shown in FIG. 1.

As shown in FIG. 3, the tape-shaped optical fiber cable 10 is formed such that the strength of the tape member 13 is lower than that of the covered optical fiber 16. Therefore, only the tape member 13 can be removed without breaking (or damaging) the optical fiber 14. Thus, a connector and the like can be easy connected to the tip of the optical fiber 14. Further, the elongate tape-shaped optical fiber cable 10 with a length of 1 m or more can be easy cut into parts with a necessary length. Thus, the production cost can be reduced.

As shown in FIG. 4A, when the tape-shaped optical fiber cable 10 is installed on the structure in bent state, a notch 21 is preferably formed at a part of the cable 10 to be bent. In FIG. 4A, the notch 21 is formed by cutting a predetermined length of the tape member 13 (i.e., a side portion of the tape member 13) located at both sides of the covered optical fiber 16. As shown in FIG. 4B, by using the notch 21-formed part of the tape-shaped optical fiber cable 10 as a bent portion 22, the tape-shaped optical fiber cable 10 can be attached on the flat surface C of a structure in flat and bent state (along the surface C). Although in FIG. 4B the tape-shaped optical fiber cable 10 is attached on the flat surface of the structure in bent state, it can be also attached while being bent in various directions.

The covering material 15 (See FIG. 1) can be formed of polyimide resin such that the covered optical fiber 16 has a high heat resistance and a high adhesion between the optical fiber and the covering material. The covering material 15 may be formed of silica, metal film etc. other than the polyimide resin.

The fiber material 11 (See FIG. 1) may be formed of aramid fiber, carbon fiber, poly-p-phenylene benzo bisoxazole (PBO) fiber etc. other than the glass fiber.

The cured resin 12 may be formed of unsaturated polyethylene resin, epoxy resin, polyimide resin, polyphenylene sulfide resin, polyether ether ketone resin, polybutene resin etc. other than the vinyl ester resin.

The optical fiber 14 embedded in the tape-shaped optical fiber cable 10 of the embodiment will be explained below.

As shown in FIG. 5A, in the preferred embodiment, a holey fiber (HF) 30 is used as the optical fiber 14. The holey fiber 30 comprises a clad 32 that has plural elongate holes 33 formed in the longitudinal direction of the fiber, and a core 31 defined as a center portion of the fiber that is surrounded by the plural holes 33 and has a higher refractive index than the holes 33.

Alternatively, a holey fiber (i.e., a photonic crystal fiber) 34 as shown in FIG. 5B may be used in which plural holes 35 are formed at microscopic intervals in the form of a crystalline lattice (i.e., a honeycomb structure) in the clad 32.

Furthermore, the core 31 of the holey fibers 30, 34 shown in FIGS. 5A, 5B may be formed of a material with a higher refractive index than that of the clad 32 as used in usual optical fibers.

Figure 6:
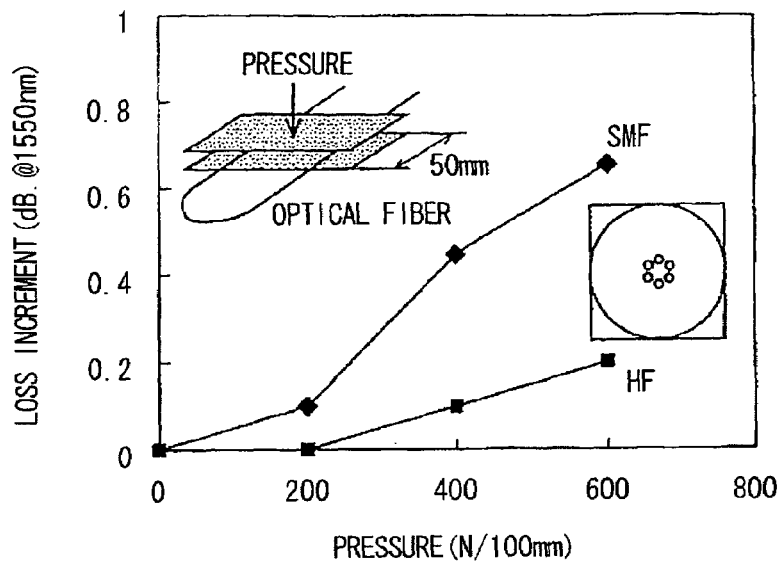
FIG. 6 is a graph showing relationships between a loss increment and pressures (lateral pressures) of HF and SMF.

FIG. 6 is a graph showing a comparison result between a transmission loss increment caused by lateral pressure in a normal (solid) single-mode fiber (SMF with a relative refractive index difference of 0.3%) and that in the holey fiber 30. The transmission loss as shown in FIG. 6 is measured under conditions that the optical fiber is bent in U-form and a pressure is applied, in a length of 50 mm on one side (i.e., 100 mm on both sides), to the optical fiber.

As shown in FIG. 6, the lateral pressure-loss increment characteristic of the SMF is not less than 0.4 dB at 400 (N/100 mm), and not less than 0.6 dB at 600 (N/100 mm). In contrast, the lateral pressure-loss increment characteristic of the holey fiber 30 is about 0.1 dB at 400 (N/100 mm), and about 0.2 dB at 600 (N/100 mm).

From the above, it is confirmed that the bending loss and lateral pressure loss of the holey fiber 30 is significantly reduced as compared to the normal SMF. In the embodiment, since the holey fiber 30 is used as the optical fiber 14, the loss increment generated by micro-bending caused when embedding the optical fibers 14 in the tape member 13 or caused when installing the tape-shaped optical fiber cable 10 in bent state can be reduced.

Further, in the embodiment, even when the optical fiber 14 is embedded in the tape member 13, the transmission loss can be reduced (i.e., suppressed to an extent equal to that of the communications optical fiber) as compared to the tape-shaped optical fiber cable 70 with the normal optical fiber embedded therein. Thus, the cable 10 is suited to measure the distribution of strain or temperature over a long distance.

Furthermore, since the loss caused by the micro-bending can be reduced by using the holey fiber 30, when measuring temperature by detecting Raman scattering light, a change in light intensity caused by the bending can be reduced and distinguished from a change in light intensity caused by temperature. Thus, the temperature measurement can be conducted at high accuracy.

Figure 7:
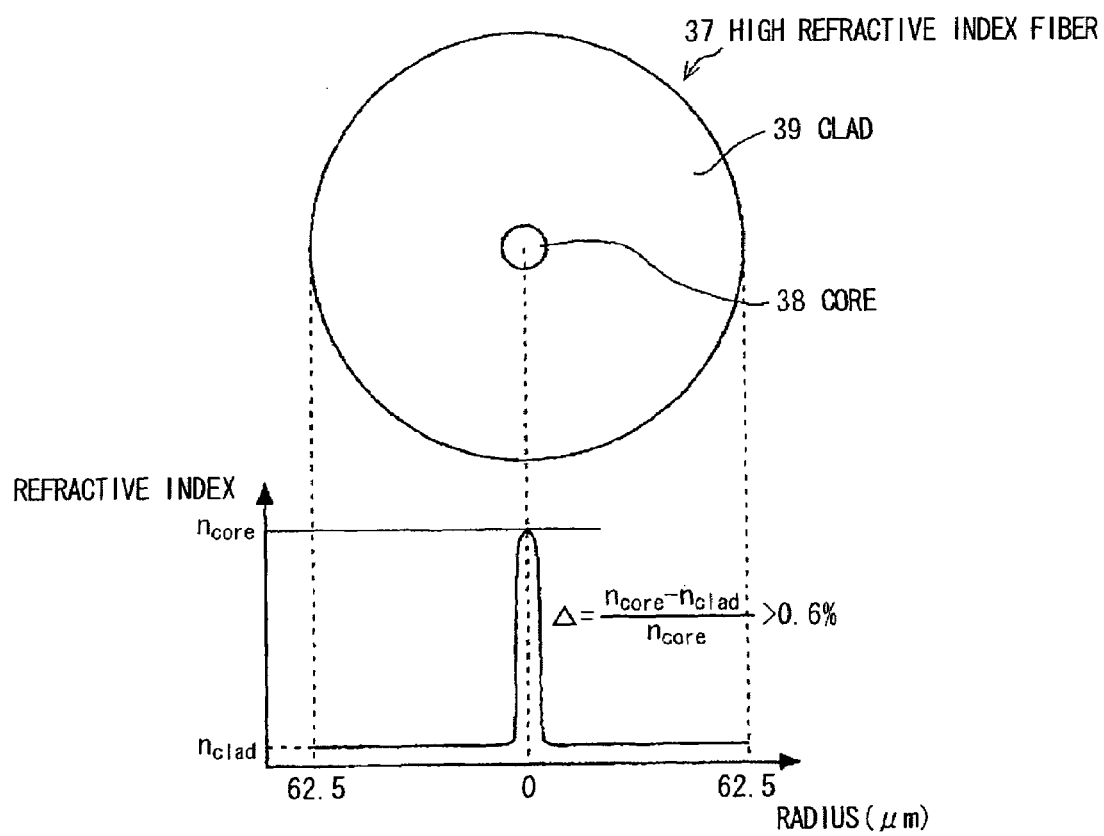
FIG. 7 is a cross sectional view showing an optical fiber with a high relative refractive index difference and a graph showing a refractive index distribution on a cross section of the optical fiber.

As shown in FIG. 7, the optical fiber 14 may be formed with a high refractive index fiber 37 with the relative refractive index difference of 0.6 to 3.0% between a core 38 and a clad 39 instead of the holey fiber 30.

The high refractive index fiber 37 has a reduced bending loss as compared to the normal optical fiber as in the holey fiber 30. Thus, a tape-shaped optical fiber cable with the high refractive index fiber 37 can reduce the micro-bending and the loss increment caused by the micro-bending.

A fiber Bragg grating (FBG) may be formed in the optical fiber 14. The FBG is a periodical refractive index change formed in the optical fiber 14, and its period (grating interval) and refractive index can be set to reflect only light with a particular wavelength. From a change in wavelength of the reflected light, it can be detected that some physical impact is applied to the FBG. The optical fiber with the FBG can be used as a strain or temperature sensor. Further, the tape-shaped optical fiber cable with the FBG can be used as an acceleration sensor by being attached to a jig whose acceleration is proportional to a change in grating interval.

A tape-shaped optical fiber cable in the other preferred embodiment will be explained below with reference to FIGS. 8 and 9.

Figure 8:
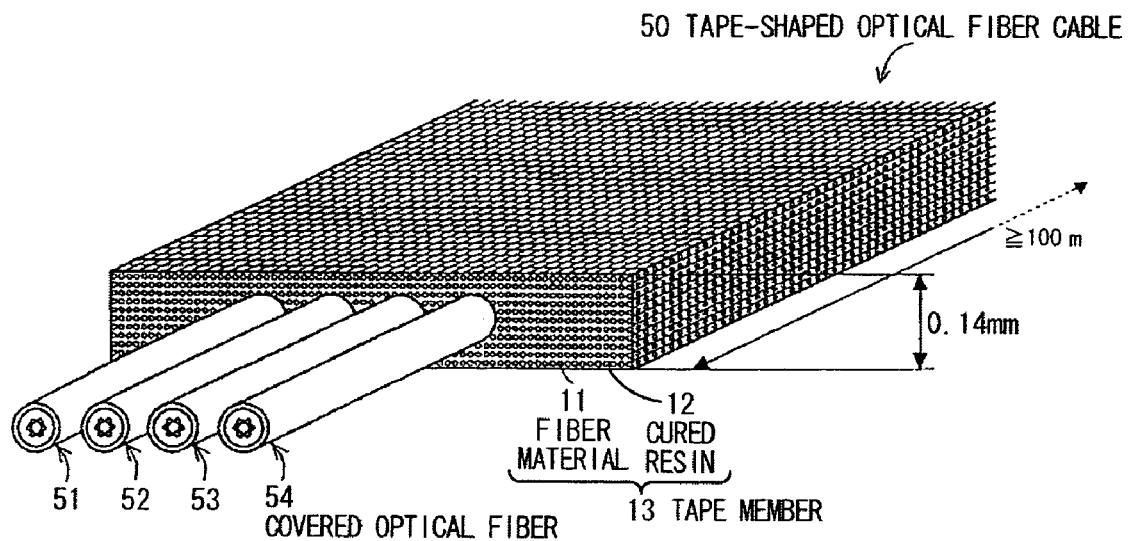
FIG. 8 is a perspective view showing a tape-shaped optical fiber cable with plural covered optical fibers.
Figure 9:
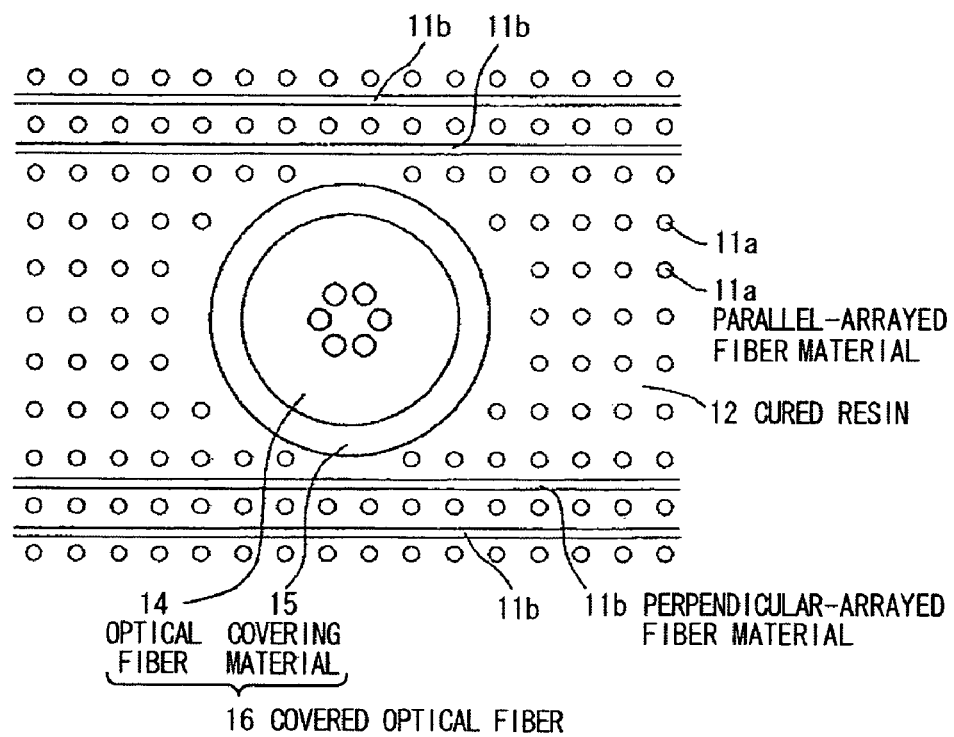
FIG. 9 is a cross sectional view showing an enlarged substantial part of FIG. 8.
Figure 10:
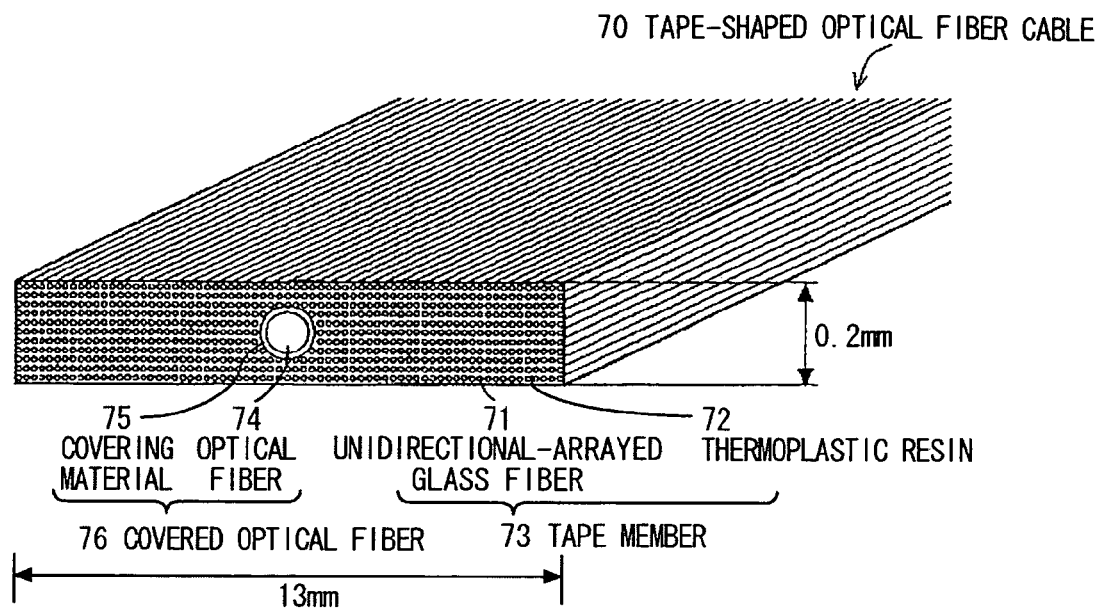
FIG. 10 is a perspective view showing the conventional tape-shaped optical fiber cable.
Figure 11:
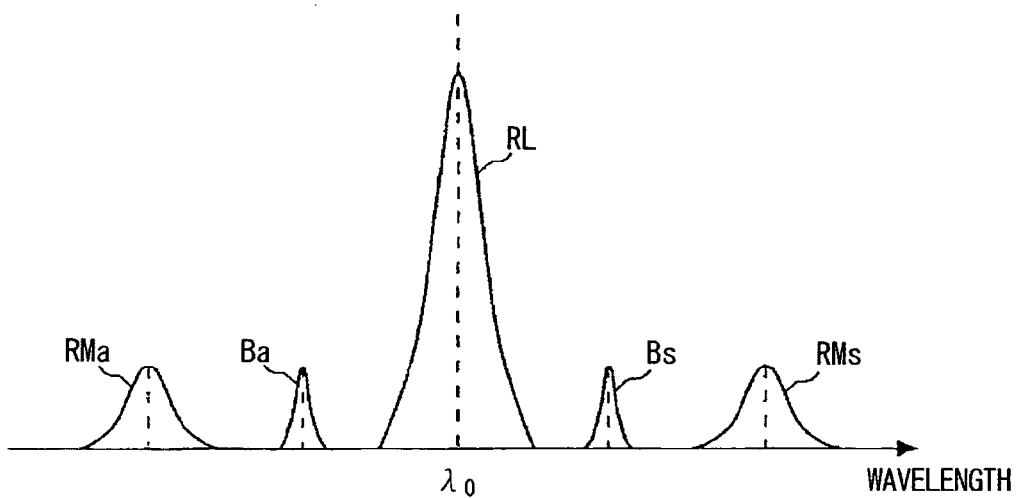
FIG. 11 is a graph showing a backscattered light spectrum.

As shown in FIGS. 8 and 9, the tape-shaped optical fiber cable 50 of the embodiment is different from the tape-shaped optical fiber cable 10 as shown in FIG. 1 in that it is formed with plural (four in FIG. 8) covered optical fibers 51, 52, 53, 54 embedded in the tape member 13.

The four covered optical fibers 51 to 54 are each 100 μm in outer diameter (the optical fiber is 80 μm in outer diameter), and embedded in the tape member 13 in parallel. Thus, the tape-shaped optical fiber cable 50 can have a thickness of 0.14 mm in total. The cable 50 is not less than 100 m in length.

By embedding the plural covered optical fibers 51 to 54 in the single tape member 13, different kinds of physical quantity such as strain and temperature can be measured by using the one tape-shaped optical fiber cable 50, and a physical quantity can be measured at plural positions of a structure.

In this embodiment, of the four covered optical fibers 51 to 54, the two covered optical fibers 51, 52 are used to measure strain and the other two covered optical fibers 53, 54 are used to measure temperature. Meanwhile, the covered optical fiber 52 for the strain measurement and the covered optical fiber 54 for temperature measurement are provided as a spare.

Although the invention has been described with respect to the specific embodiments for complete and clear disclosure, the appended claims are not to be thus limited but are to be construed as embodying all modifications and alternative structures that may occur to one skilled in the art which fairly fall within the basic teaching herein set forth.

What is claimed is:

1. A tape-shaped optical fiber cable, comprising:
    a tape member comprising a fiber material and a cured resin formed around the fiber material; and
    an optical fiber embedded in the tape member,
    wherein the optical fiber is covered by a covering material,
    the fiber material comprises a bidirectional fiber material, and
    the optical fiber is embedded in the tape member such that one fiber array direction of the bidirectional fiber material is parallel to a longitudinal direction of the optical fiber and an other fiber array direction of the bidirectional fiber material is perpendicular to the longitudinal direction of the optical fiber.

2. The tape-shaped optical fiber cable according to claim 1, wherein:
    the cable comprises a thickness of 46 to 225 μm.

3. The tape-shaped optical fiber cable according to claim 1, wherein:
    the optical fiber comprises a holey fiber or a photonic crystal fiber, each of which comprising a plurality of holes formed in a clad thereof.

4. The tape-shaped optical fiber cable according to claim 1, wherein:
    the optical fiber comprises a relative refractive index difference of 0.6 to 3.0%.

5. The tape-shaped optical fiber cable according to claim 1, wherein:
    the covering material comprises a polyimide resin.

6. The tape-shaped optical fiber cable according to claim 1, wherein:
    the fiber material comprises at least one of a glass fiber, an aramid fiber, a carbon fiber, and a poly-p-phenylene benzo bisoxazole (PBO) fiber.

7. The tape-shaped optical fiber cable according to claim 1, wherein:
    the cured resin comprises at least one of an unsaturated polyethylene resin, a vinyl ester resin, an epoxy resin, a polyimide resin, a polyphenylene sulfide resin, a polyether ether ketone resin, and a polybutene resin.

8. The tape-shaped optical fiber cable according to claim 1, wherein:
    the tape member comprises a notch formed at a side thereof.

9. The tape-shaped optical fiber cable according to claim 1, wherein:
    the optical fiber comprises a fiber Bragg grating formed therein.

10. The tape-shaped optical fiber cable according to claim 1, wherein:
    a tip portion of the optical fiber protrudes from the tape member, and
    a protective material to protect the optical fiber is formed on the tip portion.

* * * * *